Figure 1:
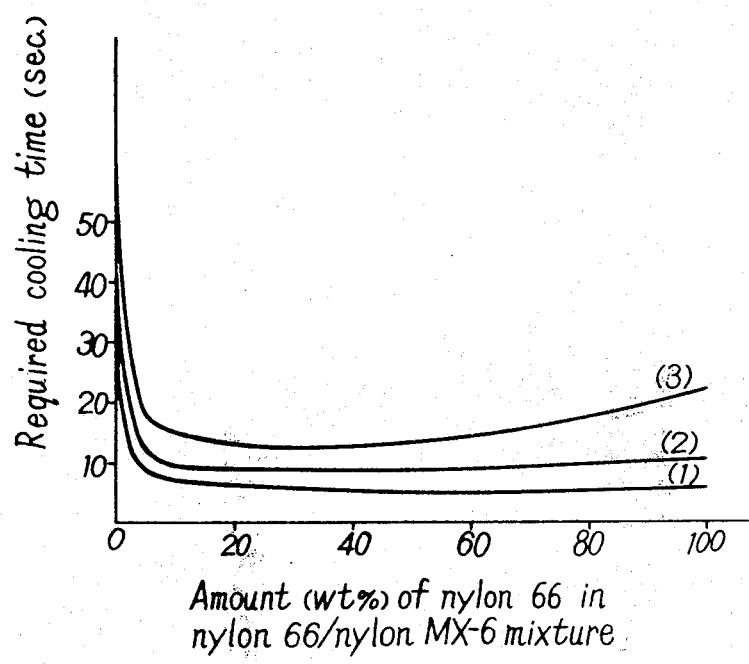

United States Patent [19]  [11] 3,968,071
Miyamoto et al.  [45] July 6, 1976

[54] POLYAMIDE RESIN MOLDING COMPOSITION

[75] Inventors: Akira Miyamoto; Mitsuyasu Nagano; Kiyoshi Morishige, all of Hiratsuka, Japan

[73] Assignee: Mitsubishi Gas Chemical Company, Inc., Tokyo, Japan

[22] Filed: Nov. 20, 1975

[21] Appl. No.: 633,847

[30] Foreign Application Priority Data
Dec. 26, 1974  Japan..........................49-136040

[52] U.S. Cl...................... 260/37 N; 260/857 TW
[51] Int. Cl.$^2$......................................... C08L 77/06
[58] Field of Search................... 260/37 N, 857 TW

[56] References Cited
UNITED STATES PATENTS 3,498,872  3/1970  Sterman et al.................... 260/37 N
3,766,131  10/1973  Arkles........................... 260/37 N X FOREIGN PATENTS OR APPLICATIONS
28,601  5/1965  Japan........................... 260/857 TW Primary Examiner—Lewis T. Jacobs
Attorney, Agent, or Firm—Haseltine, Lake & Waters

[57] ABSTRACT

A polyamide molding composition is disclosed comprising the admixture of glass fibers, nylon 6,6, and an MX nylon, obtained from the condensation of a xylylenediamine and an $\alpha,\omega$-straight chain aliphatic dibasic acid having 6–12 carbon atoms.

6 Claims, 1 Drawing Figure

POLYAMIDE RESIN MOLDING COMPOSITION

This invention relates to a polyamide resin composition. More particularly, the invention pertains to a xylylenediamine type polyamide resin composition for molding which has been shortened in molding cycle time and improved in moldability, and which can give a molded article excellent in physical properties.

A polyamide resin synthesized from a xylylenediamine composed mainly of m-xylylenediamine and an $\alpha,\omega$- straight chain aliphatic dibasic acid (the said resin will be abbreviated to "MX nylon", hereinafter) is a synthetic resin which is being watched with keen interest as a material for production of high elastic modulus fibers or biaxially stretched films. However, so-called unstretched molded articles thereof, which have not been subjected to stretching step, have not been considered to be industrially valuable, in general. Usual polyamide resins such as nylon 6 [poly($\epsilon$-caprolactam)], nylon 66 [poly(hexamethylene adipamide)], etc. have a property of undergoing ductile fracture at normal temperature, particularly in air having an ordinary humidity, and are tough even in an unstretched state. Accordingly, unstretched articles thereof (such as unstretched films, extruded tubes, injection molded articles, etc.) have also been put into practical use from old times, as well as stretched articles such as fibers, monofilaments, biaxially stretched films, etc. In contrast, MX nylon in an unstretched state has a property of undergoing brittle fracture at normal temperature and is markedly inferior in impact resistance, so that it is considered that unstretched products thereof have not been able to find any industrial value.

We conducted extensive studies on the practical utilization of unstretched molded articles of MX nylon to find that when MX nylon is blended with a glass fiber, the above-mentioned disadvantages are greatly overcome to give a molding material or molded article that is more excellent in chemical, thermal and mechanical properties than the known glass fiber-reinforced thermoplastic resin molding material. One of the disadvantages common to polyamide resins is that they are high in water absorptivity and are large in variation of dimension and of mechanical, thermal and electrical properties. It has also been pointed out that MX nylon fibers are inferior in hot water resistance (are large in variation of mechanical properties when treated with water at elevated temperatures). However, molded articles obtained from molding materials prepared by blending MX nylon with glass fibers are markedly improved in the above-mentioned properties. That is, unstretched articles, e.g. injection-molded articles, obtained from MX nylon molding materials reinforced with glass fibers are high in elastic modulus, strength, heat distortion temperature, and resistance to water, acids, alkalis, oils and organic solvents, and hence are useful plastic products.

The MX nylon referred to in the present invention is a polyamide resin synthesized by the polycondensation reaction of m-xylylenediamine or a diamine mixture comprising more than 60% of m-xylylenediamine and less than 40% of p-xylylenediamine with an $\alpha,\omega$-straight chain aliphatic dibasic acid having 6 to 12 carbon atoms which is represented by the general formula $HOOC(CH_2)_nCOOH$. Examples of the above-mentioned dibasic acid are adipic acid, sebacic acid, suberic acid, undecanedioic acid and dodecanedioic acid. Considering the balance of properties of the resulting molded article, adipic acid is particularly preferable among the said dibasic acids.

The aforesaid molding material gives a molded article excellent in properties as mentioned above, but is somewhat inferior in moldability. For example, 70 parts (by weight; the same shall apply hereinafter) of poly(m-xylylene adipamide) (hereinafter abbreviated to "nylon MX-6") having a relative viscosity of 2.27 as maeasured at 25°C. by dissolving 1 g. of the polymer in 100 ml. of 96% sulfuric acid, which polymer had been synthesized from m-xylylenediamine and adipic acid, was mixed with 30 parts of glass fiber chopped strands of 3 mm. in length. The resulting mixture was melted, kneaded and then extruded to the form of a string by use of an extruder, and the string was cooled by passing through a water bath, and then cut and dried to form a pellet-like molding material. The thus formed molding material was subjected to injection molding using a metal mold. The injection molding was effected while varying the metal mold temperature and the cooling time within the metal mold, and the surface hardness of the resulting molded article immediately after opening of the mold was measured by use of a Barcol hardness tester No. 935 for soft materials. When the Barcol hardness was less than 30, the molding material charged into the metal mold had not sufficiently been solidified and there was observed such phenomenon that the sprue was difficult to be drawn out or the molded article was broken at the place of sprue or runner at the time of opening of the mold.

Further, the glass fiber-reinforced MX nylon molding material used in the present invention is extremely low in molding shrinkage. Accordingly, when the mold is opened at the stage where the solidification of the molded article is insufficient, the molded article adheres to the metal mold, and the knock-out pin for knocking out the molded article from the metal mold penetrates into the insufficiently solidified and soft molded article. This phenomenon is marked to the molded article having a large thickness.

We examined the shortening of molding cycle time while judging the solidification state, which dominates the cooling time required for injection molding, of molded articles by measuring the surface hardness of a thin molded article or by measuring the degree of penetration of knock-out pin into a thick molded article. Considering the fact that the shortening of molding cycle time by shortening the cooling time in injection molding as far as possible is necessary for the enhancement of molding efficiency, it is understood from the experimental results that the range of metal mold temperatures preferable for high efficiency injection molding is divided into two; a low temperature region of 80°C. or less (a temperature of below room temperature is not considered to be adopted since the cooling of metal mold is ordinarily carried out, in consideration of economy, by liberation of heat or by introduction of air or water), and a high temperature region of 120° to 150°C.

With an aim to further shorten the required cooling time in injection molding at a temperature in the said high metal mold temperature region and to broaden the lower limit (120°C) of said temperature range, we conducted extensive studies to find that a composition prepared by mixing a polyamide resin obtained from a xylylenediamine composed mainly of m-xylylenediamine and an $\alpha,\omega$-straight chain aliphatic dibasic acid with nylon 66 is quite effective for the shortening of molding cycle time in injection molding.

In case nylon 6 is used in place of nylon 66, the required cooling time undesirably becomes longer than in the case where MX nylon is used alone. For example, in case the proportion of blended glass fiber is 43 parts per 100 parts of polyamide resin and the weight ratio of nylon 6 to MX nylon is 10:90, there are observed such phenomena that when the metal mold temperature is 130°C., the required cooling time as evaluated in terms of Barcol hardness becomes about 1.5 to 2 times longer than in the case where 100 parts of nylon MX-6 is used singly, and that when the metal mold temperature is 100°C., the Barcol hardness does not reach 10 even when the cooling time is prolonged to 300 seconds, and thus no effect of shortening the cooling time is observed. On the other hand, in case poly(ethylene terephthalate) is used in place of nylon 66, the effect of shortening the required cooling time is observed when the metal mold temperature is 100°C. but the resulting molded article is greatly deteriorated in bending strength and impact strength, while the effect of shortening the required cooling time is scarcely observed when the metal mold temperature is 130°C.

Thus, the present invention is concerned with a polyamide resin composition for molding which comprises 100 parts by weight of a mixed polyamide resin prepared by mixing 3 to 97 parts by weight of a polyamide resin obtained from a xylylenediamine composed mainly of m-xylylenediamine and an $\alpha,\omega$-straight chain aliphatic dibasic acid with 97 to 3 parts by weight of nylon 66, and, blended therewith, 10 to 100 parts by weight of a glass fiber.

A molding material prepared by blending nylon 66 with a glass fiber is relatively easily moldable as compared with a similar molding material of the MX nylon type, but gives a molded article inferior in physical properties. Thus, the conventional engineering plastic is particularly desired to be increased in strength, rigidity (elastic modulus) and hardness and decreased in thermal expansion coefficient and molding shrinkage. The present invention is markedly effective for overcoming the said disadvantages in physical properties of molded article.

An example of the relation between the required cooling time measured in terms of Barcol hardness of an injection-molded article immediately after opening of the mold and the composition of polyamide resin is shown in FIG. 1, which is a graph formed by plotting the results obtained by varying the weight ratio of nylon 66 to nylon MX-6 from 0/100 to 100/0, whereby 43 parts of glass fiber chopped strand was added to the mixed polyamide resin, at a metal mold temperature of 100°C. In the above case, the relative viscosities of nylon MX-6 and nylon 66 were 2.27 and 2.66, respectively, as measured at 25°C. by dissolving 1 g. of each polymer in 96% sulfuric acid.

The required cooling time at the time of injection molding is quickly shortened with increasing amount of nylon 66 added to nylon MX-6 at a region where the amount of nylon 66 is slight, reaches a substantially definite value when the amount of nylon 66 in the polyamide resin is 5 to 20 wt%, and is thereafter maintained at the substantially definite value. At a stage where the Barcol hardness is high, i.e. where the solidification has progressed, a minimum point is seen in the curve, and at a stage where the proportion of nylon 66 is extremely high, there is observed such a phenomenon that the required cooling time rather becomes longer. This is because nylon 66 when formed into a molded article at the metal mold temperature of 100°C. is lower in surface hardness than nylon MX-6, so that as the solidification reaches closer to the equilibrium, its rate is significantly decreased. That is, a glass fiber-reinforced polyamide resin composed of nylon MX-6 and nylon 66 is rather higher in surface hardness of molded article immediately after molding than a glass fiber-reinforced polyamide resin composed of nylon 66 only. Particularly when the amount of nylon 66 is less than 20 wt% based on the weight of MX nylon and nylon 66, there is obtained a molded article having properties that are scarcely different from those of a molded article obtained from glass fiber-reinforced MX nylon.

When viewed from only the moldability, i.e. the shortening of molding cycle time, any amount of nylon 66 may be added to attain the desired effect. When the physical properties of the resulting molded article are taken into consideration in addition thereto, however, the amount of nylon 66 to be added is preferably 3 to 20 wt% based on the total of MX nylon and nylon 66. If the resulting molded article is not required to be so excellent in physical properties, the amount of nylon 66 to be added may be properly varied within the range regulated by the present invention.

In case the amount of the glass fiber blended with the polyamide resin is excessively small, the resulting molded article cannot be sufficiently improved in mechanical properties, heat distortion temperature, etc. On the other hand, in case the amount of the glass fiber is excessively large, the composition is lowered in fluidity when brought to a molten state, which the result that not only the operation at each of extrusion, injection molding and the like steps is effected with difficulty and the degree of damage of machines used in the steps becomes great, but also a homogeneity of the molding material can difficultly be obtained and therefore the resulting molded article is deteriorated in surface state. Accordingly, the amount of the glass fiber is preferably 10 to 100 parts by weight per 100 parts by weight of the polyamide resin.

Generally, there might arise the fear that no such effect of shortening the required cooling time as mentioned above can be attained if the dispersed and mixed state of MX nylon and nylon 66 in the resulting molded article is extremely heterogeneous. Further, it is not always easy to correctly regulate the dispersed state thereof from the analytical standpoint. In the actual practice of the present invention, however, the desirable homogeneity of the molding material can be unexpectedly ensured, and the above-mentioned effect can sufficiently be realized even by adoption of such quite conventional injection molding operation that by use of a screw type injection molding machine, the composition nylon with nylon melted and kneaded in the plasticizing cylinder and then subjected to injection molding. Further, the above-mentioned effect can be attained without fail when there is adopted such procedure that the three members of MX nylon, nylon 66 and glass fiber chopped strands are dry-blended to a desired ratio by use of, for example, a V-type blender, the resulting blend is extruded through a melt extruder to the form of a string, and the string is cooled, cut and dried to form a pellet-like molding material, which is then subjected to injection molding. The intimate mixing of MX nylon 66, referred to herein, indicates the kneading thereof in the scope of polymer blending technique, and the kneading can be accomplished within some ten minutes, generally within several minutes in average.

If either one or both of MX nylon and nylon 66 are extremely low in molecular weight, there might be some cases where the resulting molded article is deteriorated in physical properties. Generally, the relative viscosity of each of the polymer is preferably 2 to 3 as measured at 25°C. by dissolving 1 g. of the polymer in 100 ml. of 96% sulfuric acid, though this varies more or less depending on the blending proportions of the polymers and the desired properties of the resulting molded article. When the relative viscosity of each polymer is within said range, it is easy, in general, to attain favorable moldability of the composition in consistent with favorable physical properties of the resulting molded article.

The composition of the present invention which consists of MX nylon, nylon 66 and a glass fiber may further be incorporated, if necessary, with any of such additives as, for example, inorganic fillers, colorants, antioxidants, ultraviolet absorbers, anti-static agents, lubricants and flame retardants, so far as the scope of the invention is not deviated and the object of the invention is not injured. Specific examples of each additives should be within the knowledges of those skilled in the art. Suitable as inorganic fillers for example are referred to talc, cray, alumina, kaolin, mica, calcium carbonate, magnesium carbonate, magnesium sulfate, zinc oxide, carbon black etc.

The present invention is illustrated in more detail below with reference to examples. In the examples, all the parts are by weight unless otherwise specified.

In the attached drawing, FIG. 1 is a graph showing the relation between the composition of a mixed polyamide resin and the time required for the molded article immediately after opening of mold to reach a surface hardness of 20, 30 or 40 in terms of Barcol hardness. The curves (1), (2) and (3) show the cases where the Barcol hardness was 20, 30 and 40, respectively.

EXAMPLE 1

To pellets of nylon MX-6 strands having a relative viscosity of 2.27 as measured at 25°C. by dissolving 1 g. of the polymer in 100 ml. of 96% sulfuric acid were added pellets of nylon 66 having a relative viscosity of 2.66 as measured in the same manner as above. The resulting polyamide resin was blended with glass fiber chopped strand of 3 mm. in length by use of a V-type blender, and then melted, kneaded and extruded to the form of a string by use of a screw type melt-extruder. The string was cooled by passing through a water bath, cut to the form of pellets by use of a rotary cutter, and then dried to prepare a molding material. In this case, the amount of the glass fiber per 100 parts of the mixed polyamide resin was made 43 parts, and the ratio of nylon 66/nylon MX-6 was varied to 10/90 and 20/80.

The thus prepared molding material was subjected to injection molding by use of an injection molding machine with a metal mold temperature of 130°C. After the molding, the cooling time required for the molded article immediately after opening of the mold to reach 20, 30 or 40 in terms of Barcol hardness was measured. The results obtained and typical mechanical properties of the molded article were as shown in Table 1.

For reference, the same molding material as above, except that no nylon 66 was added, was treated in the same manner as above. The results obtained were also shown in Table 1.

Table 1

|  |  | Reference Example 1 | Example 1 | |
|---|---|---|---|---|
| Nylon 66/Nylon MX-6 weight ratio | | 0/100 | 10/90 | 20/80 |
| Required cooling time (sec.) | Barcol hardness, up to 20 | 14 | 7.5 | 6.5 |
| | Barcol hardness, up to 30 | 16 | 9 | 9 |
| | Barcol hardness, up to 40 | 20 | 13 | 14 |
| Properties of molded article | Flexural strength (kg/cm$^2$) | 2640 | 2780 | 2690 |
| | Flexural modulus (10$^3$ kg/cm$^2$) | 117 | 120 | 117 |
| | Impact strength* (kg-cm/cm) | 39 | 41 | 39 |

*Impact strength: Izod, without notch.

EXAMPLES 2–9

To the same nylon 66 as used in Example 1 was added a varying amount of nylon MX-6 having a relative viscosity of 2.25 as measured in the same manner as in Example 1 to prepare mixed polyamide resins. 100 Parts of these polyamide resins were blended with 43 parts of a glass fiber, and the resulting blends were molded to obtain molded articles. The physical properties of the thus obtained molded articles were as shown in Table 2.

On the other hand, 100 parts of the mixed polyamide resin was blended with 67 parts of a glass fiber, and the resulting blend was molded to obtain a molded article. The physical properties of the thus obtained molded article were as shown in Table 3.

For reference, molded articles were prepared in the same manner as above, except that no nylon MX-6 was used. The physical properties of the said molded articles were also shown in Tables 2 and 3.

From Tables 2 and 3, it is clearly understood that when a part of nylon 66 is replaced by nylon MX-6, there are clearly observed the increase in strength, elastic modulus and hardness, and the decrease in thermal expansion coefficient and molding shrinkage.

Table 2

|  | Reference Example 2 | Example 2 | Example 3 | Example 4 | Example 5 |
|---|---|---|---|---|---|
| Nylon 66/Nylon MX-6 weight ratio | 100/0 | 80/20 | 60/40 | 40/60 | 20/80 |
| Tensile strength (kg/cm$^2$) | 1420 | 1470 | 1570 | 1600 | 1640 |
| Tensile modulus (10$^3$kg/cm$^2$) | 88 | 93 | 99 | 109 | 111 |
| Flexural strength (kg/cm$^2$) | 2240 | 2330 | 2450 | 2560 | 2660 |

Table 2-continued

|  | Reference Example 2 | Example 2 | Example 3 | Example 4 | Example 5 |
|---|---|---|---|---|---|
| Flexural modulus ($10^3$kg/cm$^2$) | 81 | 88 | 95 | 103 | 114 |
| Compressive strength (kg/cm$^2$) | 1480 | 1520 | 1610 | 1520 | 1960 |
| Compressive modulus ($10^3$kg/cm$^2$) | 31 | 36 | 38 | 39 | 46 |
| Hardness (Rockwell, M-scale) | 100 | 103 | 105 | 105 | 109 |
| Thermal expansion coefficient $10^{-5}$/°C | 2.99 | 2.58 | 2.16 | 2.16 | 2.10 |
| Molding shrinkage (%) |  |  |  |  |  |
| Parallel | 0.72 | 0.65 | 0.55 | 0.49 | 0.48 |
| Perpendicular | 1.08 | 0.97 | 0.81 | 0.76 | 0.65 |
| Required cooling time (sec.) Barcol hardness, up to 20 | 5.5 | 5.0 | 5.0 | 6.0 | 6.5 |
| Barcol hardness, up to 30 | 10.0 | 9.5 | 9.5 | 9.0 | 9.0 |

Table 3

|  | Reference Example 3 | Example 6 | Example 7 | Example 8 | Example 9 |
|---|---|---|---|---|---|
| Nylon 66/Nylon MX-6 weight ratio | 100/0 | 80/20 | 60/40 | 40/60 | 20/80 |
| Tensile strength (kg/cm$^2$) | 1670 | 1760 | 1870 | 2000 | 2020 |
| Tensile modulus ($10^3$kg/cm$^2$) | 112 | 120 | 131 | 143 | 145 |
| Flexural strength (kg/cm$^2$) | 2770 | 2840 | 3080 | 3170 | 3270 |
| Flexural modulus ($10^3$kg/cm$^2$) | 109 | 114 | 125 | 135 | 144 |
| Compressive strength (kg/cm$^2$) | 1240 | 1500 | 1590 | 1870 | 2080 |
| Compressive modulus ($10^3$kg/cm$^2$) | 34 | 36 | 40 | 53 | 54 |
| Hardness (Rockwell, M-scale) | 100 | 102 | 105 | 106 | 109 |
| Thermal expansion coefficient $10^{-5}$/°C | 2.37 | 2.18 | 2.05 | 2.06 | 1.90 |
| Molding shrinkage (%) |  |  |  |  |  |
| Parallel | 0.60 | 0.53 | 0.45 | 0.42 | 0.41 |
| Perpendicular | 0.95 | 0.85 | 0.73 | 0.61 | 0.52 |

EXAMPLES 10-13

Nylon MX-6 having a relative viscosity of 2.58 (as measured in the same manner as in Example 1; the same shall apply hereinafter), nylon 66 having a relative viscosity of 2.66, glass fiber chopped strands of 6 mm. in length and a talc powder were blended together in such proportions as shown in Table 4, and the resulting blend was treated in the same manner as in Example 1 to prepare a molding material. This molding material was subjected to injection molding to obtain a thick molded article. In this case, the time required for cooling of the molded article was measured in terms of the degree of depression of the molded article by means of knock-out pins. The experiment was carried out with respect to the cases where the metal mold temperature was each of 130°C. and 100°C.

That is, the molding material was injection-molded into a square rod of ½ inch × ½ inch × 5 inches, the cooling time of injection molding was varied stepwise to determine the time required for cooling the molded article to such an extent that the average value of depressions of the molded article by means of two knock-out pins decreased to 0.05 mm., and the thus obtained value was shown in Table 4.

From Table 4, it is understood that when the composition of the present invention is used, the required cooling time both in the case where the metal mold temperatures are 130°C. and 100°C. can be greatly shortened as compared with Reference Examples, in which no nylon 66 was added, and that the resulting molded article is not deteriorated in mechanical properties.

Table 4

|  |  | Metal mold 130°C. | | | Metal mold 100°C. | | |
|---|---|---|---|---|---|---|---|
|  |  | Reference Example 4 | Example 10 | Example 11 | Reference Example 5 | Example 12 | Example 13 |
| Composition | Nylon MX-6 (parts) | 100 | 90 | 90 | 100 | 90 | 90 |
|  | Nylon 66 (parts) | 0 | 10 | 10 | 0 | 10 | 10 |
|  | Glass fiber (parts) | 67 | 67 | 67 | 67 | 67 | 67 |
|  | Talc (parts) | 0 | 0 | 0.5 | 0 | 0 | 0.5 |
| Required cooling time (sec.) |  | 50 | 34 | 35 | 53 | 28 | 33 |
| Tensile strength (kg/cm$^2$) |  | 2410 | 2420 | 2430 | 2290 | 2390 | 2410 |
| Tensile modulus ($10^3$kg/cm$^2$) |  | 153 | 156 | 160 | 142 | 146 | 147 |
| Elongation (%) |  | 2.06 | 2.11 | 2.14 | 2.07 | 2.26 | 2.17 |
| Flexural strength (kg/cm$^2$) |  | 3530 | 3550 | 3460 | 3300 | 3400 | 3400 |
| Flexural modulus ($10^3$kg/cm$^2$) |  | 154 | 153 | 153 | 142 | 146 | 147 |
| Izod impact strength (kg-cm/cm) | With notch | 8.3 | 8.5 | 8.2 | 8.5 | 7.9 | 7.5 |
|  | Without notch | 63 | 60 | 45 | 83 | 78 | 50 |

COMPARATIVE EXAMPLES 1-4

The same nylon MX-6 as in Example 1 was mixed with each of nylon 6 (A) having a relative viscosity of 3.35 and nylon 6 (B) having a relative viscosity of 2.52 in a nylon 6/nylon MX-6 weight ratio of 10/90 or 20/80 to form a mixed polyamide resin. 100 Parts of this polyamide resin was blended with 43 parts of glass fiber chopped strands of 3 mm. in length to prepare a molding material. The thus prepared molding material was subjected to injection molding to investigate the relation between cooling time and Barcol hardness of the molded article. The results obtained were as shown in Table 5.

Table 5

| Composition | | | Comparative Example 1 | Comparative Example 2 | Comparative Example 3 | Comparative Example 4 |
|---|---|---|---|---|---|---|
| | | Nylon MX-6 (parts) | 90 | 80 | 90 | 80 |
| | | Nylon 6 (A) (parts) | 10 | 20 | 0 | 0 |
| | | Nylon 6 (B) (parts) | 0 | 0 | 10 | 20 |
| | | Glass fiber (parts) | 43 | 43 | 43 | 43 |
| Barcol hardness | Metal mold 130°C. | Cooling 20 sec. | 0 | 0 | 3 | 0 |
| | | Cooling 30 sec. | 15 | 0 | 42 | 25 |
| | | Cooling 40 sec. | 38 | 21 | 49 | 40 |
| | | Cooling 50 sec. | 46 | 40 | 50 | 45 |
| | | Cooling 60 sec. | 49 | 46 | 56 | 46 |
| | Metal mold 100°C. | Cooling 20 sec. | 0 | 0 | 0 | 0 |
| | | Cooling 30 sec. | 0 | 0 | 0 | 0 |
| | | Cooling 40 sec. | 0 | 0 | 0 | 0 |
| | | Cooling 50 sec. | 0 | 0 | 0 | 0 |
| | | Cooling 60 sec. | 5 | 0 | 1 | 0 |

COMPARATIVE EXAMPLES 5 and 6

Using an extruder, a blend comprising 100 parts of the same nylon MX-6 as in Example 1 and 43 parts of glass fiber chopped strands of 3 mm. in length was formed into a glass fiber-dispersed pellet-like molding material. This molding material was mixed with a commercially available poly(ethylene terephthalate) reinforced with 30 wt% of a dispersed glass fiber (the proportion of the glass fiber being 43 parts per 100 parts of the polymer). The resulting mixture was subjected to injection molding to investigate the relation between cooling time and Barcol hardness of the resulting molded article. The results obtained and typical properties of the molded article were as shown in Table 6.

Table 6

| Composition | | | Reference Example 7 | Comparative Example 5 | Comparative Example 6 |
|---|---|---|---|---|---|
| | | Nylon MX-6 (parts) | 100 | 90 | 80 |
| | | Poly(ethylene terephthalate) (parts) | 0 | 10 | 20 |
| | | Glass fiber (parts) | 43 | 43 | 43 |
| Metal mold 130°C. | Barcol hardness | Cooling 20 sec. | 41 | 39 | 37 |
| | | Cooling 30 sec. | 51 | 49 | 49 |
| | | Cooling 40 sec. | 57 | 53 | 50 |
| | | Cooling 50 sec. | 59 | 55 | 51 |
| | | Cooling 60 sec. | 60 | 55 | 52 |
| | Flexural strength (kg/cm²) | | 2640 | 2330 | 2300 |
| | Impact strength (kg-cm/cm)* | | 39 | 35 | 35 |
| Metal mold 100°C. | Barcol hardness | Cooling 20 sec. | 10 | 39 | 38 |
| | | Cooling 30 sec. | 21 | 52 | 51 |
| | | Cooling 40 sec. | 37 | 58 | 57 |
| | | Cooling 50 sec. | 40 | 63 | 61 |
| | | Cooling 60 sec. | 40 | 66 | 66 |
| | Flexural strength (kg/cm²) | | 2630 | 2400 | 2360 |
| | Impact strength (kg-cm/cm)* | | 68 | 53 | 47 |

*Impact strength: Izod, without notch.

What we claim is:

1. A polyamide resin composition for use in molding, which comprises a mixed polyamide resin comprising 3 to 97 parts by weight of a polyamide resin obtained from a xylylenediamine and an α,ω-straight chain aliphatic dibasic acid having 6 to 12 carbon atoms and correspondingly 97 to 3 parts by weight of nylon 66, and blended therewith, a glass fiber in amount of 10 to 100 parts by weight per 100 parts by weight of said mixed polyamide resin.

2. A polyamide resin composition according to claim 1, wherein the mixed polyamide resin is composed of 80 to 95 parts by weight of a polyamide resin obtained from a xylylenediamine and an α,ω-straight chain aliphatic dibasic acid and 20 to 5 parts by weight of nylon 66.

3. A polyamide resin composition according to claim 1, wherein the xylylenediamine is m-xylylenediamine or a mixture of more than 60% of m-xylylenediamine and less than 40% of p-xylylenediamine.

4. A polyamide resin composition according to claim 1, wherein an α,ω-straight chain aliphatic dibasic acid is adipic acid.

5. A polyamide resin composition according to claim 1, wherein the relative viscosity of both of the polyamide resin obtained from the xylylenediamine and an α,ω-straight chain aliphatic dibasic acid and nylon 66 is 2 to 3 measured at 25°C. by dissolving 1 g. of the polymer in 100 ml. of 96% sulfuric acid.

6. A polyamide resin composition improved in moldability in injection molding, which comprises a mixed polyamide resin composed of MX nylon that is the product from the polycondensation reaction of a xylylenediamine with an α,ω-straight chain aliphatic dibasic acid of 6 to 12 carbon atoms and nylon 66 at the MX nylon-to-nylon 66 ratio of 80-95 : 20-5 by weight, and blended therewith, a glass fiber in amount of 10 to 100 parts by weight per 100 parts of said mixed polyamide resin.

* * * * *